May 7, 1946. P. O. WELCH 2,399,966
TOOL HOLDER
Filed Oct. 2, 1944 2 Sheets-Sheet 1
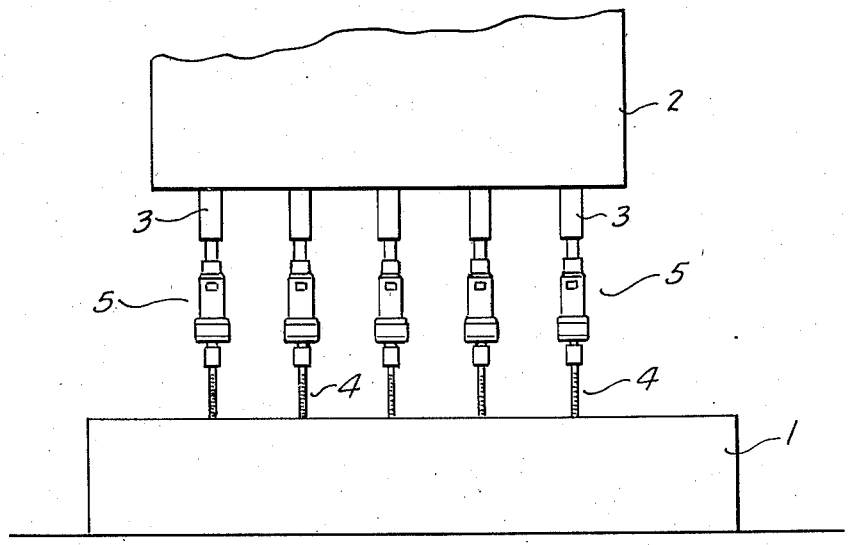
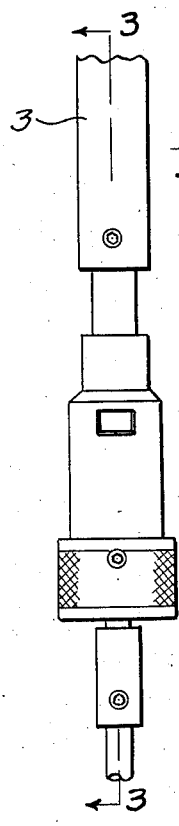
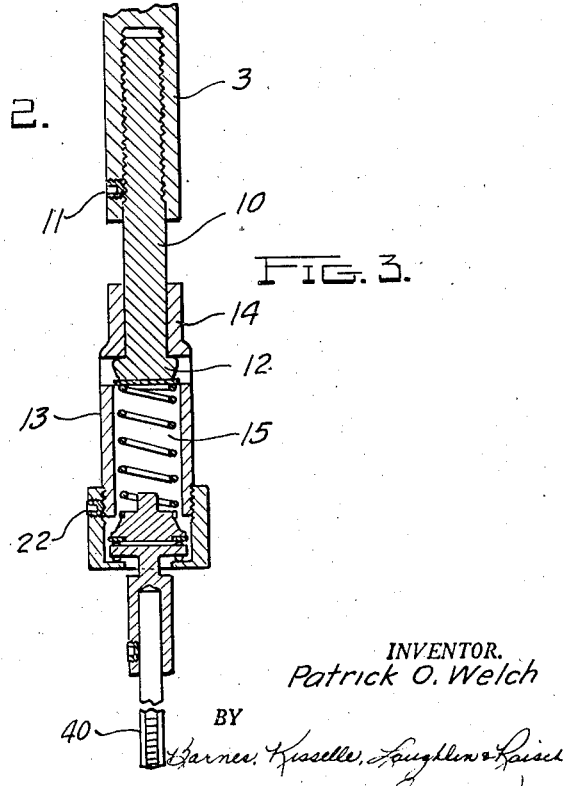
INVENTOR.
Patrick O. Welch May 7, 1946.  P. O. WELCH  2,399,966
TOOL HOLDER
Filed Oct. 2, 1944  2 Sheets-Sheet 2
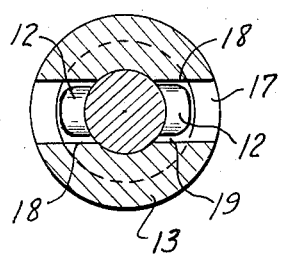
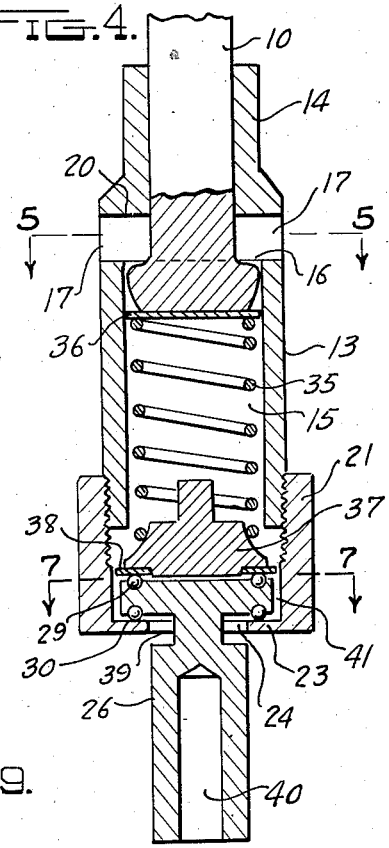
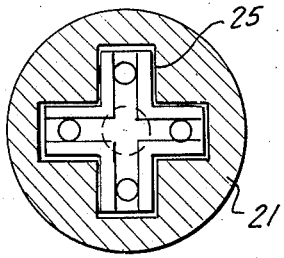
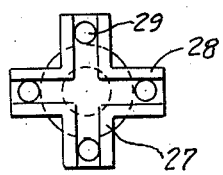
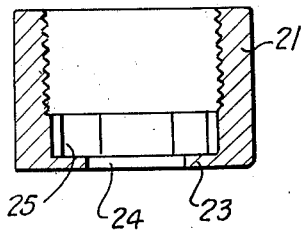
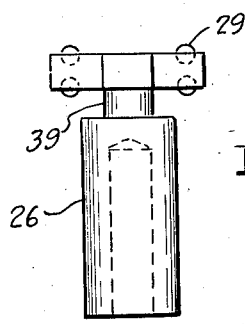
INVENTOR.
Patrick O. Welch
BY
Barnes, Kisselle, Laughlin & Raisch
Attorneys Patented May 7, 1946

2,399,966

UNITED STATES PATENT OFFICE 2,399,966

TOOLHOLDER

Patrick O. Welch, Birmingham, Mich.

Application October 2, 1944, Serial No. 556,805

4 Claims. (Cl. 10—135)

This invention relates to a tool holder and it has to do particularly with a tool holder for a rotary tool, such as a tap or drill.

The invention is particularly adaptable for use in connection with gang drilling or tapping where a plurality of tools operate on the work substantially simultaneously. Where a plurality of taps for threading holes in a work piece are simultaneously advanced into a work piece, one or more taps may meet a higher than ordinary resistance and the tap may be broken. The present invention provides an arrangement where a tap which meets extraordinary resistance, which may otherwise result in breakage to the tap or other damage, is automatically released from the rotating spindle or shaft. Upon the return action, the tap is again coupled to the spindle shaft and rotated in the reverse direction so that it may be removed from the work. Sometimes one or more rotating spindles or shafts of a machine may not be lined up with a hole or holes in the work piece with sufficient precision, with the probable result of breakage of the tap or the improper threading of the hole and otherwise rendering the work piece imperfect. In accordance with the invention, the tool holder positions the tap in a floating manner so that the tap, while driven rotatably may function eccentrically of the spindle or shaft, and the tap is guided by the hole which is being threaded.

While certain aspects of the invention are particularly applicable in connection with the taps, and while the invention is disclosed with relation to the taps, it is, of course, to be appreciated that the invention is applicable to other rotary tools, such as drills or the like. Also the holder may be used with a single tool machine as distinguished from a gang machine. The above objects and other objects will be more fully appreciated by a consideration of the following description in connection with the accompanying drawings:

Fig. 1 is a general view of a diagrammatic nature showing a gang tapping machine for operating upon a piece of work.

Fig. 2 is a side elevational view of a holder constructed in accordance with the invention.

Fig. 3 is a sectional view taken substantially on line 3—3 of Fig. 2.

Fig. 4 is an enlarged cross-sectional view showing the position of the parts when the driving connection for the rotary tool is broken.

Fig. 5 is a cross-sectional view taken on line 5—5 of Fig. 4.

Fig. 6 is a sectional view of the driving member for the tool holder.

Fig. 7 is a sectional view taken on line 7—7 of Fig. 4.

Fig. 8 is a side elevational view of the element which actually and directly holds the rotary tool.

Fig. 9 is a plan view looking at the top of Fig. 8.

In Fig. 1, the work piece is shown at 1, while the advancing head of a gang machine is shown at 2. This head has a suitable number of spindle shafts 3 projecting therefrom. The rotary cutting tools, such as taps, are shown at 4 and each is connected to a spindle shaft by the tool holder of this invention, generally indicated at 5. It will be understood that the head 2 advances toward the work while the spindle shafts 3 are rotating and the rotary tools 4 are advanced into the work.

As will be seen, by reference to Figs. 2 and 3, the spindle shaft is suitably connected to what may be termed a connecting shaft or drive shaft 10. As indicated in Fig. 3, the connecting shaft is screw threaded into the spindle shaft and locked by a set screw 11. The lower end of the connecting shaft is of inverted T construction. The cross head of the inverted T being shown at 12. A hollow member 13, which forms a housing, has an upper portion 14 which slidably fits the connecting shaft 10. Below the portion 14, the member 13 has an inner bore or hollow formation, as at 15, which is of larger diameter than the passage through the member 14. In fact, the diameter of the chamber 15 is such that it may rotatably receive the cross head 12 of the connecting shaft.

There is a shoulder 16, which defines the upper end of the cavity 15 and the member 13 is formed with a passage therethrough, as at 17. This passage or opening cuts through the shoulder 16 so that it leaves facets 18, provided by the thickened metal defining the shoulder. This will be seen by reference to Figs. 4 and 5. When the cross head 12 lies in alignment with the opening 17 there is a driving engagement between the connecting shaft 10 and the member 13. This engagement is preferably loose in that the cross head fits loosely between the facets 18 with clearance as shown at 19. The cross head may move upwardly to its limit against a shoulder 20 at the top of the opening 17.

There is a driving member in the nature of a socket or cap 21, which may be screw threaded to the member 13 and locked by a set screw 22.

This cap has a bottom flange 23 which defines an opening 24 and the inside of the bottom of the cap is provided with a recess construction which may be cruciform so as to provide recesses 25.

The tool gripping or receiving element is shown generally at 26 and it has a head which may be cruciform as shown at 27 (Fig. 9), having four arms 28 equipped preferably with anti-friction bearings on its upper and lower surfaces, as shown at 29 and 30. The head 27 drivingly fits into the notches 25. This again is preferably a loose driving fit in that the arms 28 fit in the notches 25 with some clearance as shown in Fig. 7.

Within the chamber 15 is a coil spring 35 which bears at one end on the connecting shaft 10, preferably through the means of an interposed washer 36 and which bears at its opposite end on a centering spring seat 37, equipped with a washer or raceway 38.

It will be seen that the balls 29 function on the raceway 38 and the balls 30 function on the flange 23. The member 26 passes through the opening 24 with some clearance, as shown, and this may be accomplished by a reduction in the cross dimension of the member providing a neck formation 39. The member 26 may be recessed at 40 for the reception of a tool 4. It will be observed by reference to Fig. 4, that the cross dimension of the head 27 is less than the cross dimension of the cruciform slot structure in the socket 21 thus leaving a clearance space 41. This permits the head 27 to shift to an eccentric position relative to the axis of rotation of the connecting shaft 10 and housing member 13.

In making the assembly, the connecting shaft 10 is first passed into the member 13 and then the coil spring and the washer 36 may be located. The tool holding member 36 may then be positioned in the socket member 21 with the washer 38 and spring holder 37 positioned thereover. The remaining step of the assembly is to screw thread the socket 21 onto the hollow sleeve or housing member 13.

Normally, the parts are positioned as shown in Fig. 3. The spring 35 urges the housing 13 and all parts connected therewith downwardly so that the cross head 12 abuts the shoulder 20. The spring also centers the tool receiving member. When the shaft 10 turns, the housing 13 is caused to turn by reason of the inter-engagement of the cross head with the facets 18. The looseness or clearance at 19 provides a small degree of relative rotation between the shaft 10 and the housing. The housing in turn causes rotation of the socket, which in turn causes rotation of the tool receiving member 26 by reason of the engagement of the arms 28 in the slots or notches 25 of the cruciform structure in the socket. As will be observed, by reference to Fig. 7, the arms 28 fit loosely in the cruciform structure so that there is a few degrees of relative rotation permitted and at the same time the member 26 may shift laterally with respect to the axis of the shaft 10 and housing member 13. In this manner the ultimate tool holder 26 and the tool held thereby are mounted in a floating manner.

In the operation, the gang head 2 advances with the spindle shafts rotating which rotates the tools. If one of the holes to be tapped by a tool is slightly disaligned relative to the spindle shaft 3, the respective tap may shift laterally into proper alignment with the hole in the work piece. Thereafter, as the spindle shaft and tool holder rotate the tap is rotated while it remains eccentrically disposed. The advancement of the gang head 2 causes advancement of the rotary tools by the pressure of the springs 35. The strength of the springs 35 may be selected for a proper operation depending upon the size and type of work to be performed. Large or heavy work may require heavier springs than small lighter work. If one of the rotary cutting tools meets an exceptional resistance such as may break the tool, the spring 35 will be compressed as the connecting shaft advances and when the shaft has moved axially relative to the housing 13 to a point where it is released from the facets 18, the driving connection is broken. Thereafter, the connecting shaft 10 continues to rotate while the housing and the cutting tool remain stationary, during which time the cross head of the connecting shaft moves downwardly in the housing 13 against the action of the spring. When the gang head is reversed for upward movement, relative to the work and the rotation of the spindle shafts reversed, the disconnected cross head will rotate reversely and move upwardly in the housing 13. When the cross head moves up to the point where it enters between the facets 18 the driving connection is re-established with the tool and it will be rotated reversely for removal from the work. Obviously, a properly tapped hole is not provided in the work and this hole may have to be retapped by a subsequent operation. But this would occur in any event when the tap meets such resistance that it cannot progress into the work. With the present invention, it will be seen that breakage of the taps is eliminated and broken taps are not left in the work piece.

I claim:

1. A tool holder for a rotary cutting tool, such as a tap or drill or the like adapted to be advanced toward a work piece comprising, a rotary shaft arranged to be advanced toward the work, said shaft having an enlarged end with driving abutments, a coupling member slidably mounted on the shaft and having a chamber for slidably receiving the enlarged end of the shaft, one end of the chamber having abutments for cooperating with those on the shaft to establish a driving connection, tool receiving means carried by the coupling member to be rotatably driven thereby, and spring means in the chamber acting between the shaft and the coupling member and arranged to hold the shaft and coupling member in a position so that the abutments are in driving relationship, said spring means arranged to yield as the shaft advances toward the work while the tool receiving means fails to advance due to excessive resistance whereby to disengage the driving abutments and uncouple the driving relationship between the shaft and the tool receiving means.

2. A tool holder for a rotary cutting tool, such as a tap or drill or the like adapted to be advanced toward a work piece comprising, a rotary shaft arranged to be advanced toward the work, said shaft having a T shaped end, a coupling sleeve slidably mounted on the shaft, said sleeve having a chamber for slidably and rotatably accommodating the shaft head, one end of the chamber having notches for receiving the T head for establishing a driving connection between the shaft and the sleeve, a socket member secured to the sleeve, a tool receiving member having a driving engagement with the socket member, a spring in the chamber acting between the shaft and the tool receiving member and serving normally to hold the T head in the notches, said spring adapted to yield as the shaft advances toward the work and the tool receiving means fails to advance due to excessive resistance whereby the T head advances out of the notches and breaks the driving connection between the shaft and the tool receiving means.

3. A tool holder for a rotary cutting tool, such as a tap or drill or the like adapted to be advanced toward a work piece comprising, a rotary shaft arranged to be advanced toward the work, said shaft having a T shaped end, a coupling sleeve slidably mounted on the shaft, said sleeve having a chamber for slidably and rotatably accommodating the shaft head, one end of the chamber having notches for receiving the T head for establishing a driving connection between the shaft and the sleeve, a socket member secured to the sleeve, a tool receiving member having a driving engagement with the socket member, a spring in the chamber acting between the shaft and the tool receiving member and serving normally to hold the T head in the notches, said spring adapted to yield as the shaft advances toward the work and the tool receiving means fails to advance due to excessive resistance whereby the T head advances out of the notches and breaks the driving connection between the shaft and the tool receiving means, said spring arranged to cause the T head to reenter the notches upon reversal of the direction of rotation of the shaft and retraction of the shaft from the work for turning the tool out of the work.

4. A tool holder for a rotary cutting tool such as a tap or drill or the like comprising, a driving member, a tool receiving member, the driving member having a socket with laterally extending notches, the tool receiving member having a head with projections disposed in the notches whereby to provide a driving connection, the socket having lateral dimensions exceeding those of the head whereby the head may shift laterally relative to the driving member so that the tool may be operated on an axis offset relative to the axis of the driving member, a spring seat on the side of the head opposite the bottom of the socket, a spring acting upon the seat for urging the head against the bottom of the socket and for normally centering the head therein and anti-friction bearing means between the spring seat and the head and between the bottom of the socket and the head.

PATRICK O. WELCH.